(12) United States Patent
Mader et al.

(10) Patent No.: US 9,290,145 B2
(45) Date of Patent: *Mar. 22, 2016

(54) DETECTING A TRANSPORT EMERGENCY EVENT AND DIRECTLY ENABLING EMERGENCY SERVICES

(71) Applicant: GUARDITY TECHNOLOGIES, INC., Plano, TX (US)

(72) Inventors: Joseph Thomas Mader, Plano, TX (US); Thomas Edward Mader, Plano, TX (US); Russell Carl McKown, Richardson, TX (US)

(73) Assignee: GUARDITY TECHNOLOGIES, INC., Plano, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/197,688

(22) Filed: Mar. 5, 2014

(65) Prior Publication Data

US 2014/0187191 A1    Jul. 3, 2014

Related U.S. Application Data

(63) Continuation of application No. 13/276,991, filed on Oct. 19, 2011, now Pat. No. 8,676,151.

(60) Provisional application No. 61/394,605, filed on Oct. 19, 2010.

(51) Int. Cl.
| | | |
|---|---|---|
| H04W 4/04 | (2009.01) | |
| B60R 21/0136 | (2006.01) | |
| G08G 1/00 | (2006.01) | |
| H04W 4/22 | (2009.01) | |
| H04W 76/00 | (2009.01) | |
| H04M 11/04 | (2006.01) | |
| H04L 29/08 | (2006.01) | |

(52) U.S. Cl.
CPC ............ *B60R 21/0136* (2013.01); *G08G 1/205* (2013.01); *H04W 4/22* (2013.01); *H04W 76/007* (2013.01); *H04L 67/12* (2013.01); *H04M 11/04* (2013.01)

(58) Field of Classification Search
CPC .............................. H04W 4/22; H04W 4/021
USPC ................ 455/404.1, 404.2, 412, 456.1, 521; 340/539.13, 901, 902, 903
See application file for complete search history.

*Primary Examiner* — Cong Tran (57) ABSTRACT

The present invention provides a system and method that provides a standardized and portable automatic emergency event notification, or AEEN, device which detects a vehicle or other transport emergency event and then automatically and directly dials 911 emergency services and further provides the 911 operator with important information pertaining to the emergency event. Ordinary transport owners may readily install the AEEN device of the present invention into their vehicle or other transport. The AEEN device does not involve a subscription service and the device cellphone which places the 911 call does not require activation on a wireless service network.

20 Claims, 7 Drawing Sheets

FIG. 1C  Example on-OBDII-connector Placement of In-Vehicle AEEN Device

FIG. 2A  Example OBDII Implementation of AEEN Device

DETECTING A TRANSPORT EMERGENCY EVENT AND DIRECTLY ENABLING EMERGENCY SERVICES

CROSS-REFERENCE TO RELATED APPLICATIONS

This application claims benefit to and is a continuation of application Ser. No. 13/276,991, entitled "DETECTING A TRANSPORT EMERGENCY EVENT AND DIRECTLY ENABLING EMERGENCY SERVICES", filed on Oct. 19, 2011, now issued U.S. Pat. No. 8,676,151, issued on Mar. 18, 2014, which claims benefit to provisional application No. 61/394,605, entitled "DETECTING A TRANSPORT EMERGENCY EVENT AND DIRECTLY ENABLING EMERGENCY SERVICES", filed on Oct. 19, 2010, the entire contents of which are hereby incorporated by reference.

FIELD OF THE INVENTION

The present invention relates to mobile communication devices, in-vehicle data-acquisition, emergency event detection, and more particularly, the automatic direct notification of emergency services when an emergency event is detected. Emergency events may include vehicle or other transport crashes, fires, medical emergencies, or other threats to safety.

BACKGROUND OF THE INVENTION

Seconds can make the difference between life and death when responding to an injury accident. As such, emergency medical care professionals utilize a 'chain of survival' model to ensure no time is wasted from the moment the call comes in until the victim is properly tended to. This model describes a series of actions that, when put into motion, greatly affect the survival likelihood of trauma victims such as those in a severe automobile accident.

The initial call to 911 is typically the first link in the critical chain of survival. This call triggers emergency services to respond to the accident, and is what emergency services use as the starting point when calculating their ever-important "response-time". A rapid emergency response is critical, but this alone cannot guarantee an acceptable elapsed time from vehicle impact to Emergency Medical Services (EMS) arrival. If the initial call to 911, or the time required gathering necessary information takes too long, a quick EMS response will likely be for naught. EMS can do nothing to reduce the time between impact and the first step in their chain, the 911 call, but reducing this time is critical for survival.

According to the U.S. National Highway Traffic Safety Administration's (NHSTA) Traffic Safety Facts (2008 data), more than 10 million police-reported car accidents occurred in the US in 2008. According to the NHSTA's Fatality Analysis Reporting System (FARS), these crashes kill nearly 40,000 people annually and result in over 3 million injuries, 2 million of which are permanent. Many of these deaths and permanent injuries could have been prevented if help would have arrived more quickly. Too many precious minutes are lost because calls for help are delayed, or because emergency responders cannot quickly locate the accident.

Existing systems have demonstrated how an Automated Emergency Event Notification (AEEN) system can effectively and expeditiously notify EMS personnel of an accident. These systems incorporate automatic crash notification capabilities to detect a crash and notify their respective telematics service provider (TSP) call center. They report their vehicle's GPS location and other critical telemetry data to the call center operator. The operator then uses this information to contact the 911 Public Safety Answering Point (PSAP) nearest to the accident location to request help. These systems also enable three-way voice communications between the vehicle occupants, the service center operator, and the 911 Public Safety Answering Point. Even if the occupants are unable to communicate, the location information is used to dispatch the closest emergency response services to the vehicle.

While these services are beneficial, they have several drawbacks: 1) they are only available on certain vehicle makes and models; 2) they require expensive service contracts; and 3) oftentimes they add additional delays due to their reliance on their own third-party call center. These third-party call centers, which include those of the OnStar, ATX, and Hughes TSP's, have introduced significant procedural problems for the operators at the 911 PSAP centers that are responsible for the EMS dispatch. The TSP calls come into the PSAP on non-priority administrative phone lines which may be in use for routine administrative purposes. Furthermore, the remote TSP call center must determine the appropriate local PSAP to call based on the client vehicle's GPS location and a possibly out-of-date location-indexed PSAP administrative phone number directory and, as a result, the wrong PSAP may be called. Finally, once the appropriate TSP to PSAP call is achieved, the PSAP operator is required to obtain the critical crash/emergency location from a verbal transmission of the multi-digit GPS coordinate data. This round about and error prone AEEN-to-TSP-to-PSAP call procedure is in sharp contrast to a real 911 call to the PSAP wherein the critical callback number and GPS location automatically and immediately appear on the 911 operator's display at the PSAP that is nearest to the 911 caller.

Until recently, these types of services were the only means to implement an automatic emergency event notification system. However, this is no longer the case. With the recent deployment of modernized E911 capabilities across all mobile networks within the US, third party TSP services must no longer be a mandatory element of automatic emergency event notification systems. As part of its efforts to improve public safety, the Federal Communications Commission (FCC) adopted rules, as set forth in 47 C.F.R. §20.18, to improve the reliability of wireless 911 services and the accuracy of the location information transmitted with a wireless 911 call. These rules, which are already in effect, require wireless service providers to: 1) transmit all 911 calls to the nearest PSAP, regardless of whether the caller subscribes to the provider's service and 2) provide the latitude and longitude of the 911-originating cellphone. These coordinates must be accurate to within 50 to 300 meters depending on the type of technology used.

Like the US, many other countries utilize a single emergency telephone number, like 911, which is usually known as either the 'universal emergency telephone number' or the 'emergency services number'. While this number may vary from country to country, it is usually a three-digit number, for example, '112' throughout the European Union. Current GSM or 3G wireless devices are preprogrammed with a list of emergency telephone numbers and will automatically place an appropriate emergency call based on the detected local network. For example, a GSM cellphone user in France would automatically be connected to the correct '112' emergency operator, even if they actually dialed '911' instead. As in the US, many other countries require network operators to support emergency calls regardless of a wireless device's subscription status. They are also often required to provide wireless device location data. Although emergency services numbers and the terms and phraseology used to describe emergency call infrastructure and technology may differ from country to country, a wireless device user's experience with these services is similar across most countries. As such, for convenience and readability, the language used herein will be based upon US emergency services systems, but should be understood to encompass all similar systems worldwide.

Although vehicle manufacturers are beginning to recognize that E911 enables their AEEN systems to directly dial 911, their systems do not integrate an inactive cellphone to leverage the mobile operators' requirements to support such a device. Additionally, their AEEN systems are natively integrated into their vehicles' electronics systems in such a way that they are only available on a limited number of new models from select manufacturers. Furthermore, some of these AEEN systems, for example the Ford SYNC AEEN, depend upon a wirelessly tethered user-provided cellphone with service contract to place the 911 call. This is not a dependable solution as the user's cellphone may not be present, have an adequately charged battery, may be damaged or ejected in a crash, or may otherwise not be properly connected with the AEEN system. Additionally, by relying on a user provided cell phone, these AEEN systems do not benefit from the advantage of utilizing maximum power RF transmitters or ideal cellular technologies.

Now that third-party services are no longer required for wireless 911 location services, what is needed is a small, crash-resistant, self-contained, AEEN device with which ordinary transport owners may inexpensively upgrade their transport with the latest AEEN safety technology. These transports include cars, trucks, buses, trains, motorcycles, boats, aircraft, etc. For convenience and readability, all transport entities will be referred to as 'vehicles" herein. Such an AEEN device would advantageously utilize a standard connector to: 1) allow easy installation into nearly any vehicle and 2) allow the device to be removed for portability between vehicles. The desired AEEN device must intelligently detect an emergency event, automatically dial 911, enable 2-way voice communications between the 911 operator and vehicle occupants, and directly provide the 911 operator with important information pertaining to the event by transmitting the data of interest for automatic entry into the operator's computer system. Such a device should preferably not require an active wireless service, an external cellphone, or the intervention of any third-party call center service.

SUMMARY OF INVENTION

The present invention provides a system and method to detect a vehicle emergency event and automatically directly contact 911 for emergency assistance through a novel standardized and portable in-vehicle AEEN device. Potential users of this device herein referred to as 'system users', include any vehicle operator that installs this device into their vehicle or has the device installed by another party. The system users are interested in improving safety for themselves and other drivers or passengers of their vehicle by reducing the response time for emergency services should the installed-vehicle be involved in an emergency event. The types of emergency events detected include those involving a vehicle crash and any other emergency that warrants calling 911 by activating a HELP/PANIC/SOS/911 function.

In the simplest embodiment of the present invention, the AEEN device utilizes one or more accelerometers to aid in the detection of a vehicle crash type of emergency event. Examples of such accelerometers include integrated single-axis and multi-axis accelerometers. The accelerometer measurements allow vehicle crash emergency events to be detected as large impacts or a sequence of sudden accelerations, decelerations, or, equivalently, a sequence of sudden forces acting on the vehicle. For example, a crash in which the vehicle is overturned or rolling can be identified by a characteristic sequence of forces that are measured with the tri-axial accelerometers. When any type of emergency event is detected, the device utilizes a preferably non-activated, cellphone to direct-dial 911. Once the call is connected, the vehicle operator may speak directly with the 911 operator via an integrated speakerphone.

According to known standard procedures for 911 operators, if a 911 caller is unable to communicate with the 911 operator, the 911 operator receives the phone's location from the network operator and dispatches emergency vehicles to the specified location. Even if the network-operator specified location is not of the desired geographic resolution, emergency vehicles are still dispatched to the general area. This accelerates arrival time and may often be aided once subsequent calls are received from bystanders that can provide additional routing details.

In addition to automatically calling the 911 operator, the AEEN of the present invention provides emergency event data to the 911 operator. The emergency event data to be provided depends on whether the detected emergency is a vehicle crash or not but includes vehicle descriptors when available and, optionally, backup location data as required and available. If there is a vehicle crash, the emergency event data may also include, for example, the pre-crash direction of travel, the number of impacts, the change of velocity (delta-V) and the angle (direction of force) for each impact, the occurrence of a roll-over, and the probability of serious injury. For convenience and readability, the term 'emergency event data' will be used herein to include any directly or indirectly sensed, measured or derived data that the AEEN device is capable of providing and that is of interest to either 911 operations at the PSAP or any of the dispatched emergency responders.

In some embodiments of the present invention, the AEEN device utilizes teletypewriter (TTY) support to transmit key emergency event data directly to the 911 operator's computer terminal. Title II of the Americans with Disabilities Act of 1990 (ADA), 28 C.F.R. Part 35, requires all U.S. PSAPs to support direct TTY access to 911 services. The AEEN device can use this TTY access capability to transmit emergency event data directly into the PSAP operator's terminal to accelerate the emergency response and reduce the possibility for data entry error.

In some embodiments of the present invention, the AEEN device has an integrated voice synthesizer with intelligent audio detection and decision capabilities. These capabilities enable the AEEN device to use synthesized voice to communicate with the 911 operator to automatically provide the emergency event data. The generation of such synthesized voice communication is done in a manner that minimizes interference with voice communications between the vehicle occupants and the 911 operator, whenever such human voice communications are present.

Some embodiments of the present invention have the further advantage of connecting through the vehicle's On-Board Diagnostics version 2 (OBDII) connector. OBDII has been made mandatory by the United States Environmental Protection Agency (EPA) on all passenger cars and light trucks sold in America since 1996. OBDII is a standard that specifies a type of diagnostic connector, its location, pin-out, signaling protocols and messaging format. OBDII provides for two-way communication with a vehicle's Electronic Control Unit (ECU) such that vehicle status data may be accessed. In these 'OBDII' embodiments, the system upgrades OBDII-compliant automobiles and trucks with the AEEN device. In the OBDII embodiments, the AEEN device is simply plugged into the vehicle's OBDII connector. The standard OBDII connector provides 12-volt DC power as well as numerous vehicle parameters and trouble codes. This enables the AEEN device to provide the 911 operator with precise vehicle identification, current vehicle status and certain crash severity indicators including airbag deployment, seatbelt usage, and pre-crash vehicle speed. This data may also be used in conjunction with all other inputs to confirm that a crash actually occurred, thereby reducing the risk of any false alarms. In addition to OBDII, other standards for a serial communications interface to a vehicle's ECU currently exist or are under development. For example, the Society of Automotive Engineers (SAE) J1939 and J1708 standards are currently in use for heavy-duty vehicles, while development is underway for HDOBD (heavy duty OBD) and wireless OBD. For convenience and readability, all OBDII references herein shall be understood to include any standard interface to the vehicle's ECU.

In 'non-OBDII' embodiments of the present invention, the system upgrades non-OBDII compliant automobiles and trucks with the AEEN device. Many pre-1996 passenger vehicles, as well as most heavy trucks and busses do not incorporate an OBDII interface. The non-OBDII embodiments are materially similar to the above OBDII embodiments in that they automatically provide communications with a 911 operator following an emergency event and may further provide the operator with the location of the vehicle. However, the AEEN device of non-OBDII embodiments may not be able to report some of the additional vehicle status information that is available with the OBDII embodiments.

Some embodiments of the present invention have the further advantage that the AEEN device has an integrated GPS receiver. This enables the AEEN device to provide the 911 operator with accurate backup vehicle location in the form of GPS latitude and longitude data, the pre-crash direction of vehicle travel, and another means for deriving vehicle speed.

Some embodiments of the present invention have the further advantage of an integrated battery backup. This enables the AEEN device to continue operation if the AEEN device is knocked free from the OBDII port, or if the vehicle's electrical system becomes inoperable.

DETAILED DESCRIPTION OF THE INVENTION

The present invention provides a system, method and computer readable medium that provides a standardized and portable AEEN device which detects a vehicle emergency event and then automatically and directly dials 911 emergency services, provides the 911 operator at the appropriate PSAP with important information pertaining to the event and enables direct voice communications between the vehicle occupants and the 911 operator. Ordinary vehicle owners may readily install the AEEN device of the present invention into their vehicles.

Figure 1A:
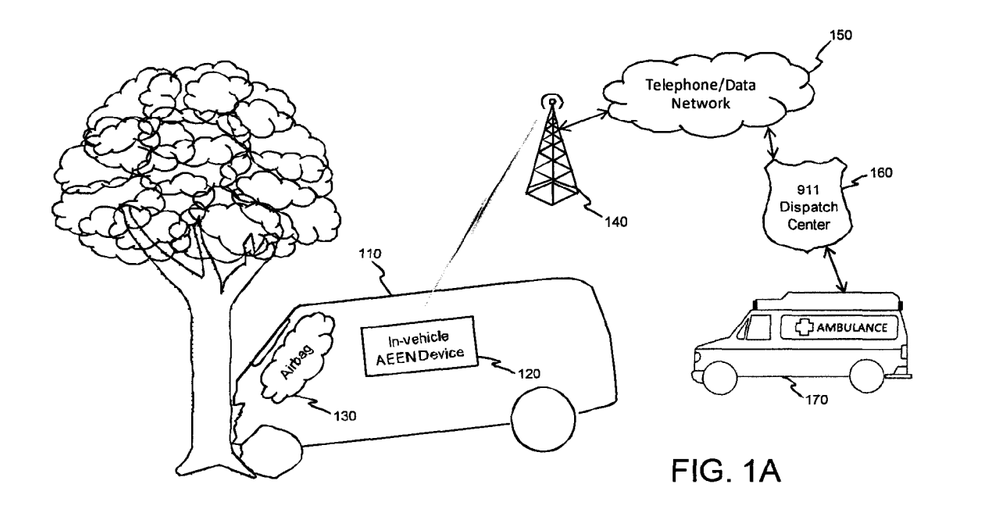
FIG. 1A depicts a diagram to directly notify 911 services of a detected emergency event in one embodiment.

FIG. 1A shows a diagram of an example embodiment of the invention in which a vehicle 110 contains the in-vehicle AEEN device 120 capable of determining if an emergency event has occurred, and if so, is capable of utilizing an integrated, preferably non-activated, cellphone to place a direct call to a 911 operator at a PSAP dispatch center 160 using the most readily available wireless network access point 140. The cellphone that is integrated into the device 120 automatically determines the most readily available wireless network access point 140 using known cellular network acquisition procedures. The AEEN device 120 and the wireless/telephone network 150 provide a standard voice phone link between the 911 operator at the PSAP EMS dispatch center 160 and the occupants of the vehicle. In the United States, this is possible with a non-activated cellphone because FCC rules require wireless service providers to transmit all 911 calls to the appropriate PSAP using the network's 911 priority telephone trunk lines regardless of whether the initiating cellphone is activated with any provider. In addition to establishing this 2-way vehicle-occupant-to-911-dispatch operator voice communication, the AEEN device 120 may use the phone call to automatically provide emergency data transmitted via synthesized voice and/or TTY to the 911 operator 160. This data for example includes vehicle status and history data that is stored in data memory 235. In either the activated cellphone case or the in-activated cellphone case, once the 911 dispatch center 160 receives the emergency call with the location of the accident vehicle 110, emergency vehicles 170 can be dispatched to the vehicle 110 that is involved in the emergency event. For example, as depicted in FIG. 1A, an emergency event can be a crash of the vehicle into a tree.

Figure 1B:
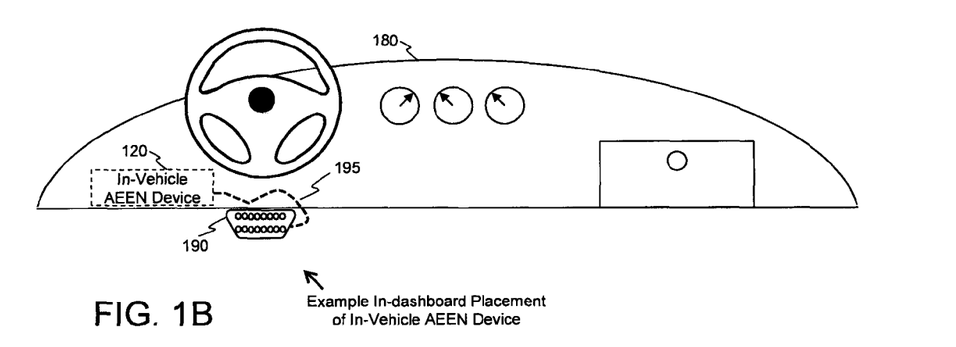
FIG. 1B depicts a diagram of an in-dashboard placement of the AEEN device in one embodiment.

FIG. 1B shows an example in-dashboard placement of the AEEN device 120 of the invention. In this example, an OBDII implementation of the AEEN device 120 is securely attached under the vehicle dashboard using any binding technique such as strong-bonding double sided tape, hook and loop fastener, form fitting cradle, securing ties, or some similarly convenient binding technique that allows the device to be firmly attached to a bracket, panel, fixture, etc., to or in the dashboard in the general vicinity of the OBDII connector 190. A short, and preferably removable, cable 195 is then used to connect the AEEN device 120 to the OBDII connector. If the vehicle does not contain an OBDII connector, the installation is the same with the exception that the connection is to the most convenient +12 VDC, ground, and any other applicable electrical terminals or wires, for example a pre-OBDII standard diagnostic connector or speed sensor. In either case, explicit installation instructions can be provided for any make and model of vehicle so that ordinary vehicle owners may install the AEEN device into their vehicle. Other AEEN device installations exist that can be performed by the ordinary vehicle owner within the scope of the present invention. For example, the AEEN device can be placed in a glove compartment or console, or on the floor, or under a seat, or in a compartment in a door.

Figure 1C:
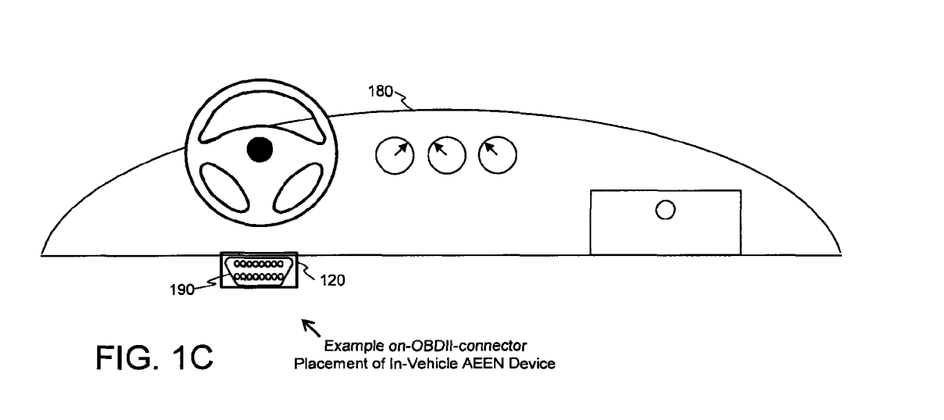
FIG. 1C depicts a diagram of an example on-OBDII-connector placement of the AEEN device of the present invention.

FIG. 1C shows an example on-OBDII-connector placement of the AEEN device 120 of the invention. In this example, an OBDII implementation of the AEEN device 120 is contained in an enclosure with an attached standard OBDII male connector so that it may directly plug into the vehicle's OBDII female connector 190, without the need for the connecting cable 195. This directly-on-OBDII-connector implementation of the AEEN device 120 of the invention has the advantage of a somewhat easier installation.

Figure 2A:
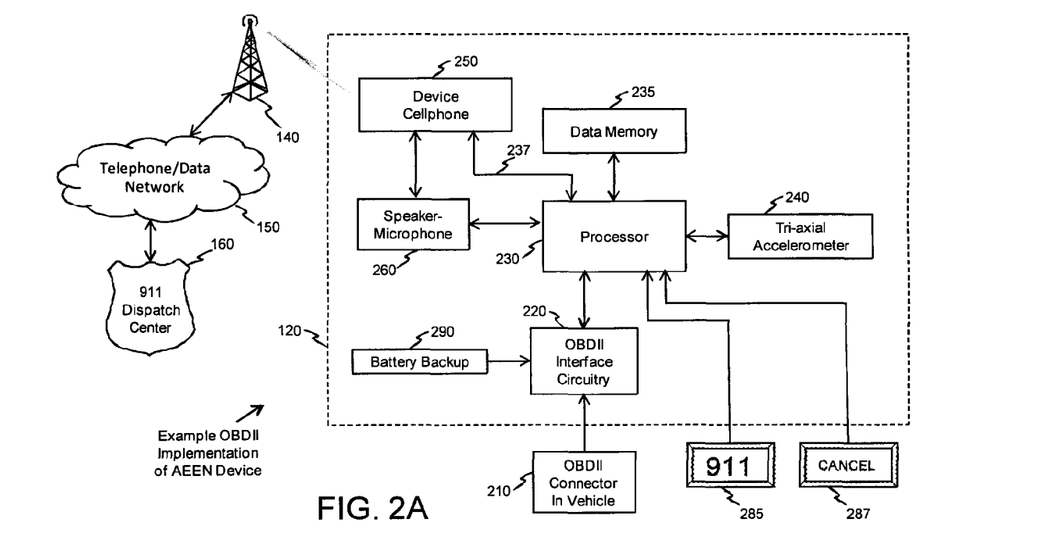
FIG. 2A depicts one embodiment of an OBDII implementation of the AEEN device that can detect a vehicle crash event or detect a PANIC/call 911 switch press and directly notify 911.

FIG. 2A shows a block diagram of an example OBDII embodiment of the AEEN device 120 of the present invention. In this embodiment, the AEEN device 120 plugs into the vehicle's OBDII connector/interface/port 210 which provides both 12-volt DC power and information-containing electrical signals to the device's OBDII interface circuitry 220. As described in the OBDII standards, the information-containing electrical signals in the OBDII port 210 provide numerous vehicle parameters including speed, engine RPM and airbag deployment; as well as the vehicle's identification in the form of its Vehicle Information Number (VIN). The OBDII interface circuitry 220 distributes the power as required and provides the OBDII-derived vehicle parameter data to the device's processor module 230. By law, the OBDII connector is easy to access, typically located within two feet of the vehicle's steering wheel and, since 1996, is mandatory on all passenger cars and light trucks sold in America. The OBDII embodiments of the AEEN device 120 of the present invention have a standard OBDII connector (a 16-pin J1962 connector) which allows any individual to connect the device to their vehicle's OBDII port 210 within minutes, given simple vehicle-specific instructions.

Referring to the example embodiment in FIG. 2A, the processor module 230 is communicably connected to a data memory 235, which may consist of a combination of volatile and non-volatile memory modules. The processor module 230 maintains a short-term history of the vehicle parameters and other data in the memory 235 to aid in emergency event identification. It is advantageous to have this short-term history saved in non-volatile memory upon the detection of an emergency event. This allows the AEEN device 120 to provide a post-event data summary to the 911 operator that indicates the type and severity of the accident and also allows the AEEN device to function as a 'black box' to aid authorities in subsequent accident investigations.

In the example OBDII embodiment in FIG. 2A, the processor module 230 is communicably coupled to an accelerometer module that can be a tri-axial accelerometer module 240. The accelerometer module 240 provides vehicle acceleration/force data to the processor 230, which uses known analysis techniques to determine if this data indicates a vehicle crash type of emergency event has occurred. For example, a front-end crash is indicated by an abrupt deceleration force with a magnitude in excess of a particular threshold. The processor 230 may also determine a vehicle crash event is indicated by monitoring the OBDII vehicle status data for the deployment of one or more airbags, activation of seat belt restraints or a very sudden drop in vehicle speed. The processor module 230 is also communicably coupled to the microphone in the speaker microphone module 260 such that in-vehicle sounds may be monitored. In the event of a vehicle crash, the in-vehicle sounds may indicate characteristic loud 'crash sounds'. By comparing the data from all of the sensors, e.g., the accelerometer sensors, vehicle speed sensors, airbag deployment sensors, seat-belt-restraint sensors, and the in-vehicle audio sensor it is possible to evaluate the data for consistency and confirmation before the final decision is made as to whether a crash event has occurred.

Continuing to refer to the example embodiment in FIG. 2A, the processor module 230 is communicably coupled to the device cellphone module 250 and when the processor decides that an emergency event has occurred, the processor 230 commands the device cellphone 250 using the processor cellphone interface 237 to place a direct call to a 911 dispatch center 160 and the cellphone 250 does so using the most readily available wireless-telephone network 140 and 150. The device cellphone 250 is on 'speakerphone' mode which uses an attached speaker-microphone 260 that is pre-adjusted to provide reliable communications between the 911 operator and any of the vehicle occupants.

Continuing to refer to the example embodiment in FIG. 2A, the processor module 230 can contain voice detection and synthesizes software and when an emergency event occurs, the processor 230 can use this software to facilitate a synthesized voice summary of the emergency event data to the 911 dispatcher 160 through the device cellphone 250. For a vehicle crash event, the summary of the emergency event data preferably includes impact details, likely passenger count based upon detected seatbelt usage, and likely injury severity in order to provide a more efficient 911 response. It is important that the synthesized voice is transmitted such that it minimally interferes with the communications between the vehicle occupant and the 911 operator. For example, the synthesized voice transmission can be controlled so that it occurs only when there has been no voice communication for a suitable short period of time, such as one or more seconds, several short duration transmissions can be used, and the detection of non-synthesized, actual voice communication can be allowed to interrupt the synthesized voice transmission.

Furthermore, the processor 230 can contain communications software that commands or otherwise works with the device cellphone 250 to provide a data communications capability. Although the data communication method may be updated to support future technologies, it is important that the device cellphone 250 provide the traditional slow rate TTY communications capability. The processor 230 can use this TTY communications capability to facilitate a TTY transmission to the 911 operator's existing TTY equipment that summarizes the emergency event data.

Continuing to refer to the example embodiment in FIG. 2A, the processor module 230 is also communicably coupled to a (PANIC) "911" button switch 285 and a "CANCEL" button switch 287. If a vehicle occupant presses the "911" button switch 285, the processor initiates the 911 call for emergency assistance. This feature can be life saving in emergency events that do not involve a crash and provide a backup 911 call initiation capability in the event of a real, but for some reason undetected, crash. In an example design, the initiation of a 911 call can be preceded by an in-vehicle alarm, for example via a synthesized voice announcement. Pressing the CANCEL button 287 allows the processor 230 to stop the 911 call if accidental. The invention intends that the 911 switch 285 and/or the CANCEL switch 287 may be implemented in many ways. For example, such a switch signal may be provided via the OBDII connector when the vehicle occupant activates certain vehicle controls or combination of vehicle controls. An example of the latter may be the simultaneous application of: 1) the parking break; 2) the standard foot break and 3) the horn. The occurrence of this form of the operator's use of the vehicle controls may be detected by the vehicle's electronic control units and transmitted to the AEEN device via the OBDII signaling bus. Other embodiments of the 911 switch 285 and/or the CANCEL switch 287 in the present invention may use wireless, e.g., Bluetooth, switching devices.

Figure 2B:
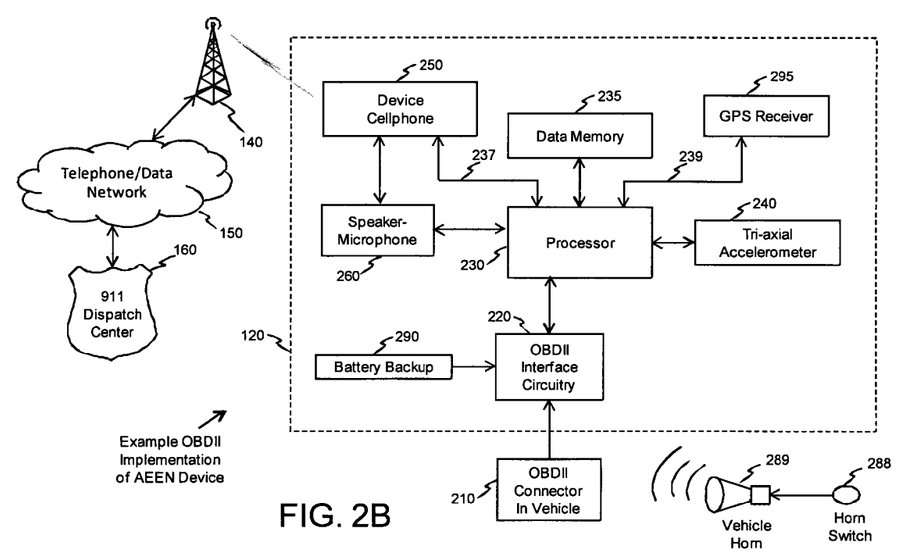
FIG. 2B depicts one embodiment of an OBDII implementation of the AEEN device that can detect a vehicle crash event or detect a PANIC/call 911 horn signal and directly notify 911.

FIG. 2B shows a block diagram of another example OBDII embodiment of the AEEN device 120 of the present invention. In the example embodiment of FIG. 2B, a vehicle horn switch 288 and horn 289 have replaced the "911" PANIC switch 285 and the "CANCEL" switch 287 of FIG. 2A. The AEEN device's microphone 260 can sense the horn sound and special sound recognition software within processor 230 can recognize the vehicle's horn sound such that the horn switch 288 can be advantageously used to provide the same functionality as the 911 PANIC switch and the CANCEL switch. For example, to provide an input signal to the AEEN device the system user can activate the horn switch 288 for a distinctly long duration such as 5 seconds. The meaning of the long duration horn signal can be context dependent. For example, an unsolicited long duration horn signal can be used to indicate a 911 PANIC situation to the AEEN device. The context then changes when AEEN device's sound system prompts the user that a 911 call will be initiated, within for example 15 seconds, unless the user cancels it by pressing the horn for 5 seconds. The invention intends that the use of audio recognition processing for providing the functionality of the 911 PANIC switch and/or the CANCEL switch should not be limited to using the vehicle's horn sound, In some embodiments of the present invention, voice recognition processing may be used. For example, a limited vocabulary, e.g. "help" or "call 911" and "cancel" or "yes" and "no", allows modern speaker independent voice recognition processing software within processor 230 to provide the functionality of the 911 PANIC switch and/or the CANCEL switch Continuing to refer to the example embodiment in FIG. 2B, the processor module 230 is communicably coupled to a GPS receiver 295 which provides the processor 230 with GPS location data using the GPS receiver-processor interface 239. The GPS receiver 295 gives the AEEN device 120 an alternative means for determining the speed of the vehicle based on the change of GPS location data with time and can provide the pre-crash direction of travel which helps the emergency responders locate and actually get to the vehicle.

Continuing to refer to the example embodiments in FIG. 2A and FIG. 2B, because the OBDII interface 210 provides a constant supply of 12 Volt DC power, the on-time behavior of the AEEN device 120 can be programmed so that the device remains active for a period of time after the vehicle is turned off. This is helpful because the vehicle occupants typically remain inside, or within close proximity to the vehicle for some time after the vehicle is shut-down. The AEEN device's emergency detection capabilities should remain active during this time. Similarly, the AEEN device should remain powered-on for a much longer period of time once an emergency event is detected, such that adequate time is allowed to complete any emergency call. The AEEN device 120 preferably also includes an integrated battery backup 290 so that the emergency 911 call may be initiated and completed even if the AEEN device 120 is knocked free of the OBDII port, or if vehicle's electrical system becomes inoperable.

Figure 2C:
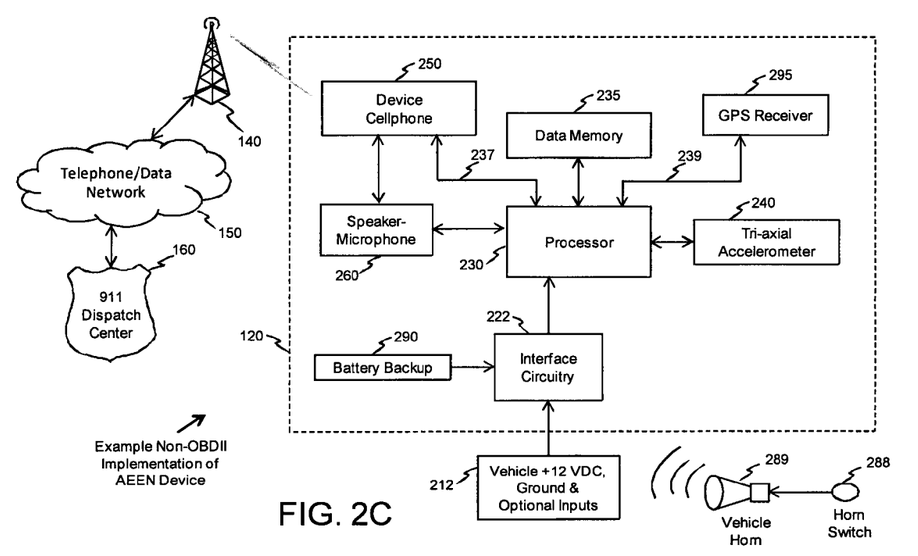
FIG. 2C depicts one embodiment of a non-OBDII implementation of the AEEN device that can detect a vehicle crash event or detect a PANIC/call 911 horn signal and directly notify 911.

FIG. 2C shows a block diagram of an example non-OBDII embodiment of the AEEN device 120 of the present invention. The non-OBDII implementations of the AEEN device 120 have a short, preferably removable, cable, that connects to the vehicles +12 VDC, ground, and any other applicable electrical terminals or wires, for example a pre-OBDII standard diagnostic connector, pressure sensor, or speed sensor, 212 which are available in several places in the vehicle, for example, in known locations under the dashboard. The interface circuitry 222 receives the +12 VDC, ground, and other optional inputs, receives the power connections from the battery backup 290, and distributes the power and other signals to the processor module 230 and other modules in the AEEN device 120 as required. Either a non-OBDII based vehicle speed input or a GPS-derived speed makes up for the loss of the vehicle speed data that was obtained from the OBDII port in the previously described OBDII implementations of the AEEN device 120 as shown in FIG. 2A. Since velocity is the time integral of acceleration, independent short-term histories of vehicle speed and acceleration may be checked for consistency to more conclusively determine if an actual vehicle crash has occurred.

In comparison, the non-OBDII embodiments are materially similar to the OBDII embodiments in that they automatically provide communications with a 911 operator in the event of an emergency event. Since the non-OBDII embodiments may require a GPS receiver to determine the vehicle speed data, they further provide the operator with backup data for the location of the vehicle. However, the AEEN device of non-OBDII embodiments may not be able to report some of the additional vehicle status information that is available with the OBDII embodiments. Finally, the OBDII embodiments may preferably also include the GPS receiver so as to have the capability of providing the 911 operator with location data as backup to the location data provided by the wireless network operator. In countries whose wireless networks have not been required to or otherwise have not made the investment of providing this location service to emergency dispatch centers, the GPS receiver is preferable in all embodiments of the AEEN device 120 of the present invention.

Figure 3A:
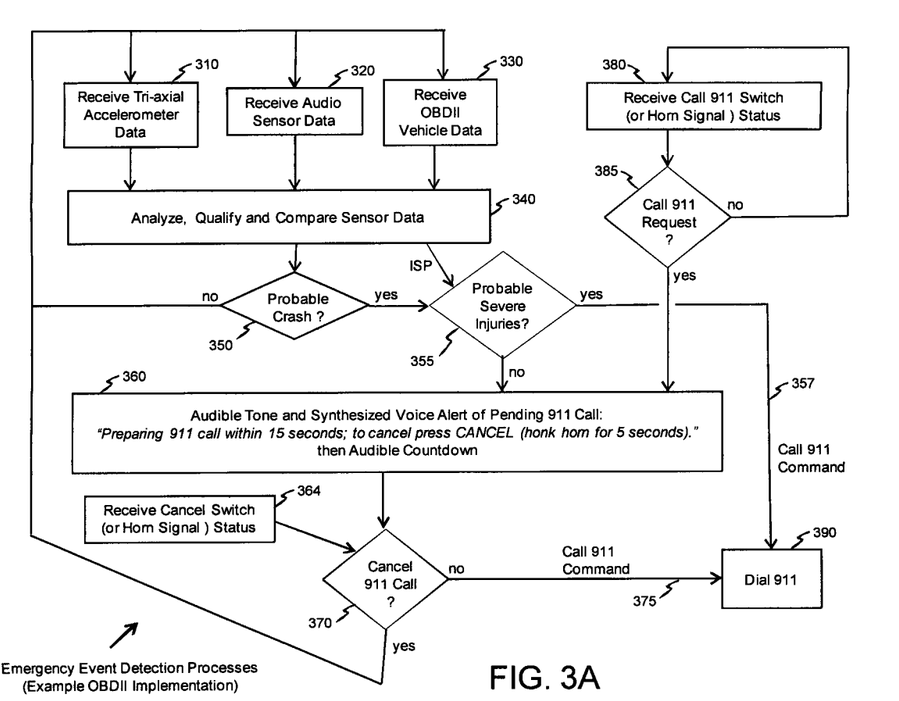
FIG. 3A depicts certain emergency event detection processes that are performed in an OBDII implementation of an AEEN device in one embodiment.

FIG. 3A shows an example logic flow diagram of certain emergency event detection processes that are performed by an example OBDII implementation of the present invention. These processes are an example of the sensor monitoring logic flow that may result in emergency event detection and/or the request of a 911 call for emergency assistance. In process module 310, the processor 230, of FIGS. 2A, 2B, and 2C, receives data from the accelerometer module 240; in process module 320, the processor 230 receives the audio data from the speaker-microphone 240; and in process module 330, the processor 230 receives OBDII vehicle status data. In process module 340, the accelerometer data, the audio sensor data, and the OBDII vehicle status data are analyzed and qualified using known sensor-specific data reduction procedures and compared to make a decision as to whether a crash emergency event has occurred. As a data comparison example, if the audio sensor data indicates a sudden high audio level but the acceleration, vehicle speed, and airbag deployment, etc., do not indicate a potential crash, then the decision would be that a crash event has not occurred. In this case, the logic flow 350 returns to modules 310, 320, and 330 to receive more sensor data.

Continuing to refer to FIG. 3A, in the case where the sensor data and analysis detects a probable vehicle crash event, the logic flow 350 proceeds to the module 355 which determines the logic flow of the AEEN crash event response based on the probability of the vehicle occupants suffering severe injuries. If there is a significant probability of severe injuries, based for example on an injury severity prediction (ISP) algorithm that inputs parameters derived from the AEEN crash data in module 340, then a Call 911 Command 357 is issued and control transfers to the Dial 911 module 390. Examples of parameters input to the ISP algorithm are crash pulse delta-V and angle data. A suitable ISP algorithm is described in detail by D. W. Kononen, C. A. C. Flanagan and S. C. Wang in "Identification and validation of logistic regression model for predicting serious injuries associated with motor vehicle crashes", Accident Analysis and Prevention 43 (2011), pp. 112-122, which is incorporated herein by reference.

Continuing to refer to FIG. 3A, in the case of a minor vehicle car crash event where the sensor data and analysis in module 340 detects a probable vehicle crash event but the ISP algorithm does not indicate a significant probability (potential) for severe injuries, then the logic flow proceeds to process module 360 which initiates audible alerts of an impending 911 call. These audible alerts may include, for example, a tone alert and a synthesized voice announcement-alert that can be generated using the voice synthesis capability of the processor module 230 and the speaker 260, both of FIG. 2. For example, the synthesized voice announcement-alert message can be "Preparing 911 call within 15 seconds; to cancel press CANCEL button (or honk the horn for 5 seconds)". This message can be followed by an audible countdown, "10, 9, 8 . . . CALLING 911". Process module 364 receives the CANCEL button or horn signal status and if either the CANCEL switch or horn signal is received logic flow 370 returns to the sensor monitoring modules 310, 320 and 330, but if not, a Call 911 Command 375 is sent to process module 390 which initiates the 911 call using the device cellphone 250 of FIG. 2.

Continuing to refer to FIG. 3A, in parallel with the above described vehicle crash detection based on sensor/vehicle data monitoring, the AEEN of the present invention may have a PANIC/call 911 button switch 285 or make use of a PANIC/call 911 horn signal which are received and monitored by process module 380. If PANIC/call 911 is received, logic flow 385 will also proceed to process module 360 which will execute the same audible alert and cancel call opportunity as described above for the case of a minor vehicle car crash event.

Figure 3B:
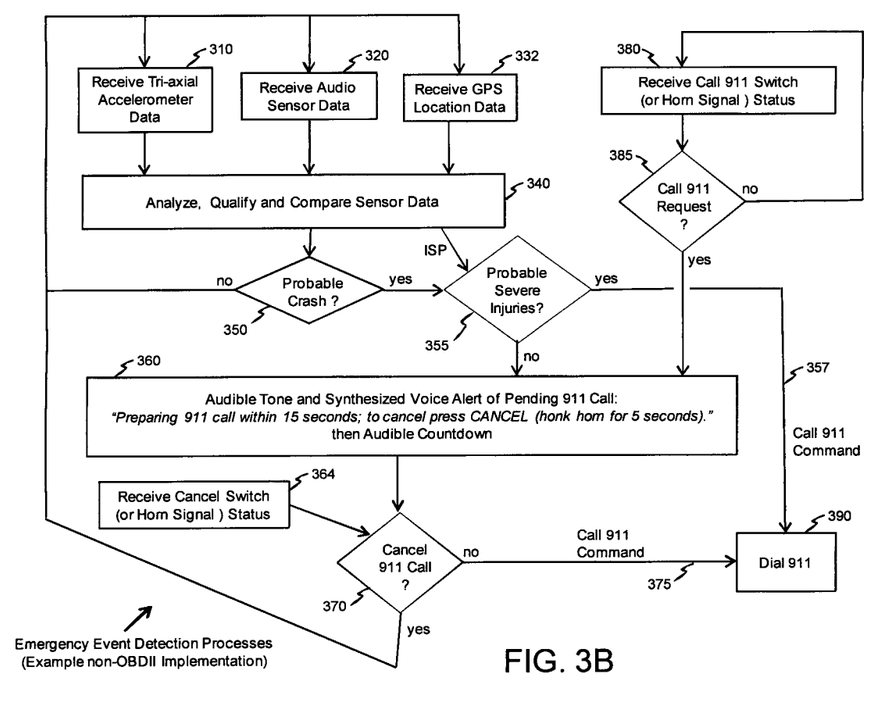
FIG. 3B depicts a flow diagram of certain emergency event-detection processes that are performed in a non-OBDII implementation of an AEEN device in one embodiment.

FIG. 3B shows an example logic flow diagram of certain emergency event detection processes that are performed by an example non-OBDII implementation of the present invention. The logic flow and process modules of FIG. 3B are identical to those of FIG. 3A with the exception that the receive OBDII vehicle data module 330 of FIG. 3A has been replaced by the receive GPS location module 332 of FIG. 3B. The 'analyze, qualify and compare sensor data' module 340 in FIG. 3B includes the additional processing required to generate vehicle speed data from the GPS location data. Other than these extensions, which are motivated as previously described, the example emergency event detection processes for the non-OBDII implementations of the AEEN device 120 are the same as for the OBDII implementations of the device.

Figure 4A:
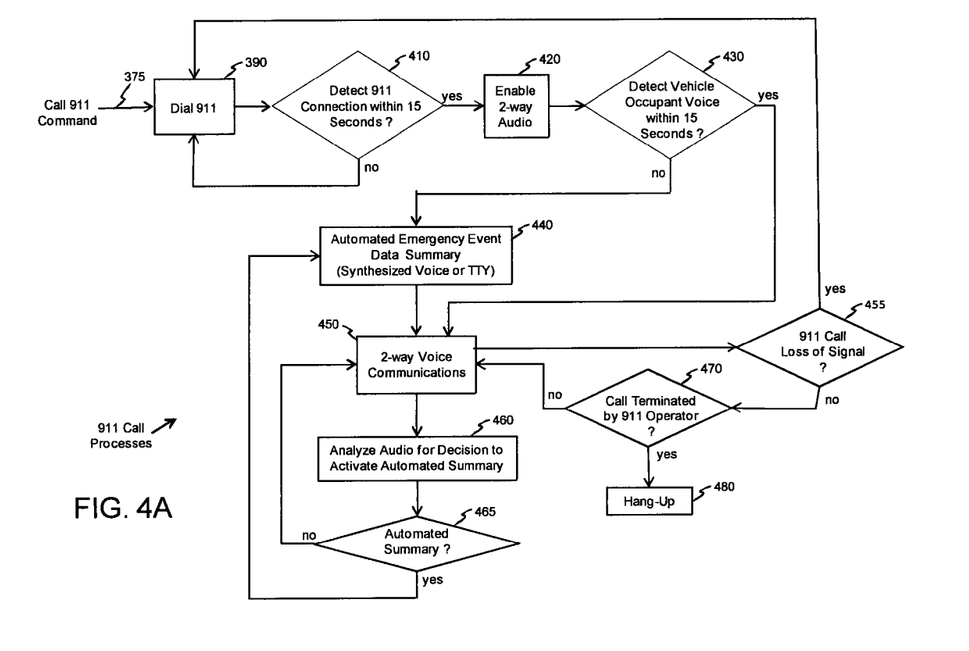
FIG. 4A depicts a flow diagram of certain 911-call processes that are performed in an implementation of an AEEN device in one embodiment.

FIG. 4A shows a logic flow diagram of certain 911 call processes performed by an example implementation of the present invention. The initiation of a 911 call by process module 390 is followed by a detection of whether the connection is established by process module 410 using signaling information provided by the device cellphone 250. If the connection is not established within a certain number of seconds, process module 410 returns logic flow to the 'dial 911' module 390 which hangs up the current call attempt and initiates another 911 call. If the connection is successful, the process flow logic proceeds to module 420 which enables 2-way audio communication between the 911 operator and the vehicle occupants, via the speaker microphone 260. Process module 430 then decides whether a vehicle occupant's voice is detected within a certain number of seconds, and if so, process logic flow proceeds to the 2-way voice communications module 450. If process module 430 decides that a vehicle occupant's voice is not detected within a certain number of seconds, logic flow proceeds to process module 440 which initiates a short-duration, automated emergency event data summary for the benefit of the 911 operator, for example, using synthesized-voice or TTY transmission. The content of the emergency event data summary depends on whether the detected emergency is a vehicle crash or not, but always includes vehicle descriptors when available. If there is a vehicle crash, the emergency event data may also include, for example, the pre-crash direction of travel and speed, the number of impacts, the change of velocity (delta-V) and the angle (direction of force) for each impact, the occurrence of a roll-over, how many occupants are believed to be in the vehicle based on OBDII data such as seat belt restraints, and the probability of serious injury. If the AEEN device 120 contains a GPS receiver, the vehicle location may also be conveyed to the 911 operator in the automated emergency event data summary.

Continuing to refer to the example logic flow diagram of the 911 call processes in FIG. 4A, the initial flow to the 2-way voice communications module 450 occurs when either an occupant voice is detected in module 430 or, if not, after the automated emergency event data summary is delivered in module 440. In either case, the 2-way voice communications process 450 is recognized as important, since voice communication between the vehicle occupants and the 911 operator is considered vital to both parties for a successful and timely emergency response. If the call is terminated due to a loss of signal, process module 455 returns logic flow to the 'dial 911' module 390 which hangs up the current call attempt and initiates another 911 call. Permanent exit from the 2-way voice communications process 450 only occurs when the process module 470 determines that the call has been terminated by the 911 operator. Usually, the 911 operator is required to remain on the line with the caller until the EMS or other emergency responders are in their physical presence. The 911 operator receives confirmation of arrival of emergency responder teams directly from those teams and also from the vehicle operator, if able. Temporary exit from the 2-way voice communications process 450 can occur based on process module 460 making a decision to activate the automated emergency event data summary which, as mentioned, can be delivered in the form of a short duration synthesized-voice or TTY transmission, for example.

One audio analysis to be performed by process module 460 is based on moment-of-silence opportunities, for example when neither the 911 operator nor the vehicle occupant(s) has/have spoken for a certain number of seconds. A second audio analysis performed by process module 460 is the automatic detection of a loud interfering broadcast from the vehicle's radio or some other source such as an in-vehicle music player. Although the vehicle occupants and the 911 operator are strongly motivated to eliminate the interfering sound source, the occupants may physically not be able to turn it off and in this case the process module 460 automatically provides the 911 operator with the synthesized-voice or TTY transmission emergency event summary. This ensures that emergency services still receives critical emergency event data that enables them to provide the most appropriate life-saving response. Third, given widespread acceptance of the AEEN device 120, the decision to activate the synthesized-voice or TTY transmission emergency event summary may include the voice recognition of known commands from the 911 operator, for example, "SUMMARY" or "REPORT". In any of these audio analysis cases, when the decision is made by module 460 to activate the automated summary, the logic flow 465 proceeds to the automated emergency event data summary process module 440 and then returns to the 2-way voice communications process module 450, otherwise the 2-way voice 450 simply remains active until terminated by the 911 operator when the emergency responder team has arrived at the vehicle location.

Figure 4B:
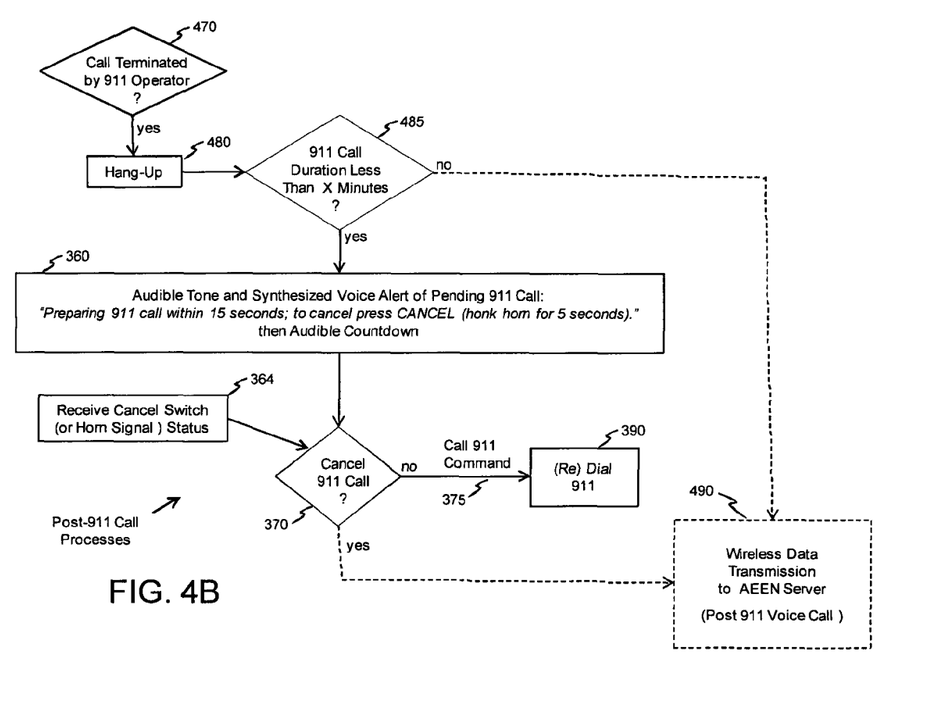
FIG. 4B depicts a flow diagram of certain post-911-call processes that are performed in an implementation of an AEEN device in one embodiment.

FIG. 4B shows a logic flow diagram of certain post-911 call processes performed by an example implementation of the present invention. If the 911 call duration is less than a threshold of X minutes, for example X=3 minutes, logic flow 485 returns to process module 360 which initiates audible alerts of an impending 911 re-dial. If the CANCEL 911 status is not received 364 logic flow 370 sends a re-dial 911 command to process module 390 which initiates an additional 911 call. This 911 re-dial procedure protects against inadvertent termination of the call by the 911 operator or by the equipment at the PSAP.

Continuing to refer to the example logic flow diagram of the post-911 call processes in FIG. 4B, AEEN system users that have an optional wireless data service can receive additional emergency related care services. For such users and upon completion of the 911 call process by either a longer than X minutes 911 call at module 485 or a cancellation of a 911 redial at module 370, module 490 activates a wireless data call to the AEEN server and communicates the complete set of emergency event data. The AEEN server may then perform a number of assistive services. For example, the AEEN server may send a text, email, or synthesized voice message to a pre-configured party or list of parties 'to be notified in case of emergency', for example, family members or primary medical doctors. Additionally, the AEEN server could be used to provide vehicle occupant medical records or other personal information to emergency services. In an alternative embodiment of the present invention the device cellphone module 250 is capable of placing 2 independent calls: 1) the emergency call to the 911 operator and 2) a simultaneous data call to the AEEN server.

Although embodiments of the present invention have been illustrated in the accompanied figures and described in the foregoing detailed description, it will be understood that the invention is not limited to the embodiments disclosed, but is capable of numerous rearrangements, additions, modifications, and substitutions without departing from the spirit of the invention as set forth and defined by the following claims. Further, although depicted in a particular manner, more than one of the depicted or described modules can be utilized in the present invention and functionality provided by one module can be fully and/or partially provided by another one of the modules. For example, the voice detection and synthesizer may be a separate module instead of being implemented in the processor module 230.

What is claimed is:

1. A method, comprising:
receiving sensor data from on-vehicle sensors of a motor vehicle during operation of the motor vehicle;
comparing the sensor data from each of the sensors to previously obtained sensor data from each of the sensors;
determining, via a processor, that an emergency event has occurred based on the comparing;
determining, via the processor, that the emergency event did not result in a severe injury;
providing an indication that emergency services will be notified of the emergency event; and
initiating a timer upon expiration of which triggers the notifying of the emergency services unless a user initiated response is received not to notify the emergency services.

2. The method of claim 1, further comprising at least one of:
generating the sensor data from an accelerometer; and
providing the sensor data to the processor.

3. The method of claim 1, further comprising at least one of:
generating the sensor data from an audio sensor; and
providing the sensor data to the processor.

4. The method of claim 1, further comprising at least one of:
generating the sensor data from an on-board diagnostics (OBDII) sensor; and
providing the sensor data to the processor.

5. The method of claim 1, wherein the comparing the sensor data further comprises determining whether a crash of the motor vehicle has occurred responsive to a sudden change in the sensor data from each of the sensors.

6. The method of claim 1, wherein the sensors comprise at least two on-vehicle sensors.

7. The method of claim 1, wherein the indication is an audible indication.

8. An apparatus, comprising:
a receiver configured to receive sensor data from on-vehicle sensors of a motor vehicle during operation of the motor vehicle;
a processor configured to
compare the sensor data from each of the sensors to previously obtained sensor data from each of the sensors, and
determine that an emergency event has occurred based on the comparison; and
a transmitter configured to notify emergency services of the emergency event;
wherein the transmitter is further configured to transmit an indication that emergency services will be notified of the emergency event;
wherein the processor is further configured to initiate a timer upon expiration of which triggers the notifying of the emergency services unless a user initiated response is received not to notify the emergency services.

9. The apparatus of claim 8, further comprising an accelerometer sensor configured to perform at least one of generate the sensor data and provide the sensor data to the processor.

10. The apparatus of claim 8, further comprising an audio sensor configured to perform at least one of generate the sensor data and provide the sensor data to the processor.

11. The apparatus of claim 8, further comprising an on-board diagnostics (OBDII) sensor configured to perform at least one of generate the sensor data and provide the sensor data to the processor.

12. The apparatus of claim 8, wherein the processor is further configured to determine whether a crash of the motor vehicle has occurred responsive to a sudden change in the sensor data from each of the sensors.

13. The apparatus of claim 8, wherein the sensors comprise at least two on-vehicle sensors.

14. The apparatus of claim 8, wherein the indication is an audible indication.

15. A non-transitory computer readable storage medium configured to store instructions that when executed cause a processor to perform:
- receiving sensor data from on-vehicle sensors of a motor vehicle during operation of the motor vehicle;
- comparing the sensor data from each of the sensors to previously obtained sensor data from each of the sensors;
- determining, via a processor, that an emergency event has occurred based on the comparing;
- notifying emergency services of the emergency event;
- providing an indication that emergency services will be notified of the emergency event; and
- initiating a timer upon expiration of which triggers the notifying of the emergency services unless a user initiated response is received not to notify the emergency services.

16. The non-transitory computer readable storage medium of claim 15, wherein the processor is further configured to perform at least one of:
- generating the sensor data from an accelerometer; and
- providing the sensor data to the processor.

17. The non-transitory computer readable storage medium of claim 15, wherein the processor is further configured to perform at least one of:
- generating the sensor data from an audio sensor; and
- providing the sensor data to the processor.

18. The non-transitory computer readable storage medium of claim 15, wherein the processor is further configured to perform at least one of:
- generating the sensor data from an on-board diagnostics (OBDII) sensor; and
- providing the sensor data to the processor.

19. The non-transitory computer readable storage medium of claim 15, wherein the comparing the sensor data further comprises determining whether a crash of the motor vehicle has occurred responsive to a sudden change in the sensor data from each of the at least two sensors.

20. The non-transitory computer readable storage medium of claim 15, wherein the indication is an audible indication.

* * * * *